United States Patent
Dubeyko et al.

(10) Patent No.: US 10,802,718 B2
(45) Date of Patent: Oct. 13, 2020

(54) METHOD AND DEVICE FOR DETERMINATION OF GARBAGE COLLECTOR THREAD NUMBER AND ACTIVITY MANAGEMENT IN LOG-STRUCTURED FILE SYSTEMS

(71) Applicant: HUAWEI TECHNOLOGIES CO., LTD., Shenzhen, Guangdong (CN)

(72) Inventors: Vyacheslav Anatolievich Dubeyko, Shenzhen (CN); Hongbo Zhang, Toronto (CA)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 56 days.

(21) Appl. No.: 15/957,599

(22) Filed: Apr. 19, 2018

(65) Prior Publication Data
US 2018/0307417 A1    Oct. 25, 2018

Related U.S. Application Data

(63) Continuation of application No. PCT/RU2015/000686, filed on Oct. 19, 2015.

(51) Int. Cl.
*G06F 12/00* (2006.01)
*G06F 3/06* (2006.01)

(52) U.S. Cl.
CPC .......... *G06F 3/0608* (2013.01); *G06F 3/064* (2013.01); *G06F 3/0652* (2013.01); *G06F 3/0653* (2013.01); *G06F 3/0674* (2013.01)

(58) Field of Classification Search
CPC ...... G06F 3/0608; G06F 3/064; G06F 3/0652; G06F 3/0653; G06F 3/0674
See application file for complete search history.

(56) References Cited

U.S. PATENT DOCUMENTS 8,156,290 B1    4/2012  Vanninen et al.
10,133,511 B2 * 11/2018 Muth .................. G06F 3/0652
(Continued)

FOREIGN PATENT DOCUMENTS

| CN | 103026346 A | 4/2013 |
| CN | 104090852 A | 10/2014 |
| CN | 104854554 A | 8/2015 |

OTHER PUBLICATIONS

Mendel Rosenblum and John K. Ousterhout, "The Design and Implementation of a Log-Structured File System", ACM Transactions on Computer Systems, vol. 10, No. 1, Feb. 1992, 15 pages.

*Primary Examiner* — David Yi
*Assistant Examiner* — Tahilba O Puche
(74) *Attorney, Agent, or Firm* — Womble Bond Dickinson (US) LLP

(57) ABSTRACT

A method for garbage collection of a volume in a log-structured file system is disclosed. The volume comprises a plurality of segments. Each of the segments comprises a plurality of blocks. An invalid block count of each of the segments is determined. The invalid block count is used as an index for ordering the segments in a garbage collection queue. A plurality of range areas are determined for the index. A migration rate of each range area is determined, and the migration rate of a given range area reflects an intensity of segment migration into/out of the given range area. A negative migration rate reflects a segment migration into the given range area. Garbage collection is performed based upon the migration rate.

20 Claims, 13 Drawing Sheets

(56) References Cited

U.S. PATENT DOCUMENTS

| | | | |
|---|---|---|---|
| 2002/0073285 A1* | 6/2002 | Butterworth | G06F 3/0608 |
| | | | 711/154 |
| 2008/0010395 A1 | 1/2008 | Mylly et al. | |
| 2011/0283049 A1* | 11/2011 | Kang | G06F 12/0246 |
| | | | 711/103 |
| 2013/0117501 A1 | 5/2013 | Yun et al. | |
| 2013/0124794 A1 | 5/2013 | Bux et al. | |
| 2013/0326117 A1 | 12/2013 | Aune | |
| 2014/0095775 A1 | 4/2014 | Talagala et al. | |
| 2014/0173176 A1 | 6/2014 | Kang | |
| 2014/0181432 A1* | 6/2014 | Horn | G06F 12/0253 |
| | | | 711/159 |
| 2015/0212937 A1 | 7/2015 | Stephens | |

* cited by examiner

METHOD AND DEVICE FOR DETERMINATION OF GARBAGE COLLECTOR THREAD NUMBER AND ACTIVITY MANAGEMENT IN LOG-STRUCTURED FILE SYSTEMS

CROSS-REFERENCE TO RELATED APPLICATIONS

This application is a continuation of International Application PCT/RU2015/000686, filed on Oct. 19, 2015, the disclosure of which is hereby incorporated by reference in its entirety.

TECHNICAL FIELD

Embodiments of the invention relate to garbage collection in log-structured file systems and, in particular, to a method and device for determination of garbage collector thread number and activity management in log-structured file systems.

BACKGROUND

The fundamental idea of a log-structured file system (LFS) is to improve write performance by buffering a sequence of file system changes in the file cache and then writing all the changes to disk sequentially in a single disk write operation. The information written to disk in a write operation includes file data blocks, attributes, index blocks, directories and almost all the other information used to manage the file system. A log-structured file system writes all new information to disk in a sequential structure called the log.

LFS uses a data structure called an inode map to maintain the current location of each inode. Given the identifying number of a file, the inode map can be indexed to determine the disk address of the inode. The inode map is divided into blocks that are written to the log. A fixed checkpoint region on each disk identifies the locations of all the inode map blocks. LFS does not place inodes at fixed positions, but are written to the log.

This can readily be seen in FIG. 1 showing a log-structured file system disk layout 10. A difficult design issue for log-structured file systems is the management of free space. The goal is to maintain large free extents for writing new data. Initially, the free space is in a single extent on the disk, but by the time the log reaches the end of the disk the free space may have been fragmented into many small extents corresponding to the files that were deleted or overwritten.

From this point, the file system can have two choices: threading or copying. Threading leaves the live data in place and threads the log through the free extents. Unfortunately, threading will cause the free space to become severely fragmented. Copying copies live data out of the log in order to leave large free extents for writing. The live data is written back in a compacted form at the head of the log. A disadvantage of copying is its cost, particularly for long-lived files.

Threading and copying are shown in FIG. 2. On the left side, a log 20 before and after threading is shown, while on the right side, a log 21 before and after copying and compacting is shown.

For a log-structured file system to operate efficiently, it should ensure that there are always large extents of free space available for writing new data. An aspect of the LFS approach is correspondingly that large free areas are maintained on the disk in order to speed-up the write process. To maintain the large free areas, the log is divided into segments, and a segment cleaner is employed to compress live information from heavily fragmented segments, thereby freeing up segments for subsequent writes.

A problem that arises in the use of the LFS relates to segment cleaning, also referred to herein as garbage collection (GC). More particularly, as the disk fills, more and more disk activity is required for GC reducing the amount of time that the disk is available to service system requests.

Segment cleaning garbage collection GC relates to the process of copying live data out of a segment. In LFS this can be a simple three-step process: read a number of segments into memory, identify the live data, and write the live data back to a smaller number of clean segments. After this operation is completed, the segments that were read are marked as clean, and they can be used for new data or for additional cleaning.

A goal of garbage collection is to maintain large free extents for writing new data. Initially, all the free space is in a single extent on disk, but by the time the log reaches the end of the disk the free space will have been fragmented into many small extents corresponding to the files that were deleted or overwritten. With increasing storage sizes, conventional methods for performing this garbage collection are overburdened by having to perform long defragmentation of a volume. Efficient GC policy should define GC threads number and intensity of GC threads activity taking into account the I/O load of main file system operations.

U.S. Pat. No. 8,156,290 B1 proposes a just-in-time continuous segment cleaning method. Just-in-time segment cleaning obtains the location of blocks of a storage system predicted to be targeted by a future write operation and cleans the blocks targeted for the future write operation prior to the occurrence of the future write operation. Just-in-time segment cleaning is performed in proportion to previous user-initiated write operations. In another aspect, just-in-time segment cleaning applies is a cost analysis determination to minimize the work of cleaning.

However, the just-in-time continuous segment cleaning method is dedicated to network storage systems and it cannot be used for the log-structured file systems use-case without modifications. Moreover, LFS uses copy-on-write (COW) policy and clearing segment before write operation can be a very expensive operation. Also invalid prediction of future write operations can have significant weight in some cases. LFS volume can be aged significantly previously and prediction of future write operations will be useless for garbage collection. This method doesn't suggest a methodology of GC threads number determination and flexible GC threads management policy.

US 20080010395 A1 proposes a method of performance optimization in solid-state media. A host device is coupled to a peripheral device such as a multi-media card or the like, wherein the peripheral device includes a solid state data storage segment. The peripheral device can initiate a defragmentation function, such as registers for comparing a current performance measure against a threshold performance metric, or block validity parameters received from the host device for the data storage segment of the peripheral device. Once met, initiating the defragmentation function executes on the data storage segment. A logical layer of the data storage segment is accessed by the host device and a physical layer of the data storage segment is accessed by the peripheral device. The defragmentation program may be resident on either the host or peripheral device. Defragmentation may be enabled to execute automatically once initiated, such as by a continuous or periodic background scan of current performance of the data storage segment.

However, the method of performance optimization in solid-state media is oriented to defragmentation only and cannot be used as basis for GC logic on log-structured file system. This method also cannot be used as a basis for elaboration of an efficient GC policy.

SUMMARY

Examples and embodiments of a method and a device are disclosed for GC threads number determination and GC threads activity management for volumes of log-structured file systems with the purpose to elaborate flexible and highly efficient GC policy for the case of copying approach. The disclosed examples and embodiments are particularly adapted to the log-structured file systems case, namely, to file systems that use a Copy-on-Write policy as base internal technique of data modifications.

Efficient GC techniques are disclosed for log-structure file systems that do not affect file system performance. LFS treats its storage as a circular log and writes sequentially to the head of log. Log-structured File Systems use Copy-on-Write (COW) policy as internal technique of data modifications. The COW policy means that modified file blocks are not updated in-place, but the modified blocks are written in a last log.

Log-structured file systems, however, reclaim free space from the tail of the log to prevent the file system from becoming full when the head of the log wraps around to meet it. The tail can release space and move forward by skipping over data for which newer versions exist farther ahead in the log. If there are no newer versions, then the data is moved and appended to the head. Inefficient GC logic can decrease performance of log-structured file system significantly.

According to one embodiment, an invalid block count is used as criterion for the structure of GC queue of pre-dirty/dirty segments, distribution of indices of GC queue array between range areas, calculation of migration rates between range areas, determination of GC threads count and GC threads activity on the basis of migration rate dynamic change.

Invalid block count can be a criterion for structure of GC queue of pre-dirty/dirty segments. GC queue can be structured as array of dirty segments chains (or trees), ordered by invalid block count as indices of an array. It is possible to distribute indices of a GC queue array between range areas. Each range area can be characterized by a migration rate value. The migration rate describes intensity of segment migration in this range area. Distribution of migration rates between range areas enhances GC queue model by knowledge about real necessity of GC activity. A range area with negative migration rate (input is greater than output) should be processed by GC.

Dependence of the migration rate of various range areas on invalid block count gives opportunity to decide how many GC threads should operate for concrete volume aging state. If some range areas contain a significant count of dirty segments and noticeable negative migration rate then such range area should have dedicated GC thread.

Behavior of negative peak of the migration rate diagram can define the intensity of GC thread activity. First, maximum value of negative peak can define count of segments that it makes sense to clear in this range area with the purpose to compensate input in this area. Second, GC should stop the clearing activity in some areas in the case of exhausting of negative peak capacity.

Examples and embodiments of methods are disclosed providing simple and efficient GC threads number determination and efficient GC thread activity management without a file system performance overhead. Disclosed examples and embodiments propose flexible and highly efficient GC policy and implementations by providing enough free segments capacity without file system performance degradation even in the case of aged volume state.

According to one embodiment, a method is disclosed for garbage collection of a volume in a log-structured file system. The volume comprises a plurality of segments. Each of the segments comprises a plurality of blocks. Invalid block count can be determined for each of the segments. The invalid block count is used as an index for ordering the segments in a garbage collection queue. For one embodiment, a plurality of range areas is determined for the index. A migration rate of each range area and the migration rate of a given range area reflecting an intensity of segment migration into/out of the given range area, and a negative migration rate reflecting a segment migration into the given range area are determined. Garbage collection can be performed based upon the migration rate.

Examples and embodiments of methods provide improved and more efficient garbage collection of a volume in a log-structured file system since garbage collection is performed only in range areas depending on the intensity of segment migration into/out of the given range area.

According to one embodiment, in log-structured file systems, each segment is a sequence of blocks. A block of a segment can assume one of the states: "free", "pre-allocated", "valid", or "invalid". These block states can be defined as follows. A "free" block is a block prepared for a write operation, which has not been allocated yet. An "invalid" block is a block which has been freed after a file update, file truncation or deletion operation but which was not collected as garbage yet. A "pre-allocated" block is a block which has been pre-allocated for a file, but which has not been written with data yet. A "valid" block is a block which has been allocated and which was written by data.

According to one embodiment, a segment can assume one of the following states: "clean," "using," "used," "pre-dirty," and "dirty." These states can be defined as follows. In the "clean" state, all blocks in the segment are free blocks. In the "using" state, a segment has valid, invalid, pre-allocated and free blocks. In the "used" state, all blocks of the segment are valid blocks. In the "pre-dirty" state, a segment comprises valid and invalid blocks only. In the "dirty" state, all blocks in the segment are invalid blocks.

According to one embodiment, a method for determining the migration rate of a given range area can determine a value of an input counter of dirty/pre-dirty segments that migrate into the given range area. A value of an output counter of partially/fully cleared segments that migrate out of the given range area is determined, and the migration rate of the given range area by means of subtraction of the value of the input counter from the value of the output counter is calculated.

According to one embodiment, a method for determining the value of the input counter of dirty/pre-dirty segments that migrate into a range area can increment the value of the input counter if segments migrate into the range area. A value of the output counter of partially/fully cleared segments that migrate out of a range area is determined, and the value of the output counter is incremented if segments migrate out of the range area.

According to one embodiment, a method performs garbage collection based upon the migration rate and negative peaks of the migration rate. According to one embodiment, a method performs garbage collection based upon negative peaks of the migration rate by identifying a negative peak of the migration rate and the range area comprising the identified negative peak. Garbage collection can be performed on the segments located in the identified range area.

According to one embodiment, a method for performing garbage collection based upon negative peaks of the migration rate includes identifying negative peaks of the migration rate, identifying the respective range areas comprising the identified negative peaks, assigning to each identified range area a priority reflecting the absolute value of the identified negative peak, and performing garbage collection of the segments located in the identified range areas depending on the priority of the identified range areas.

According to one embodiment, a method for performing garbage collection of the segments located in the identified range areas depending on the priority of the identified range areas includes performing garbage collection by means of a plurality of garbage collection threads, and assigning the identified range areas to the plurality of garbage collection threads depending on the priority of the identified range areas.

According to one embodiment, a method for performing garbage collection based upon negative peaks of the migration rate includes identifying a range area comprising a negative peak of the migration rate, performing garbage collection by means of a plurality of garbage collection threads, and if the negative peak of the identified range area is lower than a peak threshold, then the identified range area has at least one dedicated garbage collection thread.

According to one embodiment, if the negative peak of the identified range area is lower than the peak threshold and if the identified range area comprises a count of dirty/pre-dirty segments above a count threshold, then the identified range area has at least one dedicated garbage collection thread.

According to one embodiment, a method for determining a plurality of range areas of the index includes determining at least a hot range area as being the range area with the highest invalid blocks counts, a pre-hot range area as being the range area with the highest invalid blocks counts after the hot range area, a warm range area as being the range area with the highest invalid blocks counts after the pre-hot range area, and a warming-up range area as being the range area with the highest invalid blocks counts after the warm range area.

According to one embodiment, a method for performing garbage collection based upon negative peaks of the migration rate includes performing garbage collection by means of a plurality of garbage collection threads, and starting at least one garbage collection thread for the hot, pre-hot, warm, and warming-up range areas.

According to one embodiment, performing garbage collection based upon negative peaks of the migration rate includes calculating count of negative peaks of the migration rate in the hot, pre-hot, warm, and warming-up range areas, and if the count of negative peaks is lower or equal to three times the number of CPU cores, starting a single garbage collection thread for every negative peak of the migration rate in the hot, pre-hot, warm, and warming-up range areas.

According to one embodiment, a method includes determining if the count of negative peaks is above three times the number of CPU cores, dividing the count of negative peaks on three times the number of CPU cores, and starting one garbage collection for every group of calculated count of negative peaks of the migration rate in the hot, pre-hot, warm, and warming-up range areas.

According to one embodiment, determining an invalid blocks count of a segment includes determining how many blocks of the segment are invalid, and wherein an invalid block is a block that has been freed after file update, file truncation or deletion operation but that was not collected as garbage yet.

According to one embodiment, a computer program with program code can perform methods disclosed herein when the computer program runs on a computing device.

According to one embodiment, a computing device is disclosed for performing a garbage collection of a volume in a log-structured file system. The volume comprises a plurality of segments. Each of the segments comprises a plurality of blocks. The device comprises an invalid blocks count determination unit adapted to determine an invalid blocks count of each of the segments. The computing device comprises an ordering unit adapted to use the invalid blocks count as an index for ordering the segments in a garbage collection queue. The computing device comprises a range area determining unit adapted to determine a plurality of range areas of the index. The computing device comprises a migration rate determining unit adapted to determine a migration rate of each range area, the migration rate of a given range area reflecting an intensity of segment migration into/out of the given range area, a negative migration rate reflecting a segment migration into the given range area. The computing device comprises a garbage collection performing unit adapted to perform garbage collection based upon the migration rate.

According to one embodiment, the computing device can be adapted to perform the methods disclosed herein.

Disclosed examples and embodiments provide simple and efficient methods of GC thread number determination and activity management. Disclosed examples and embodiments can achieve maximum possible LFS efficiency and performance by means of flexible GC clearing policy that is based on efficient methods of GC threads activity management disclosed herein. Disclosed examples and embodiments can also achieve robust and efficient LFS GC clearing policy that provides enough free segments capacity without file system performance degradation even in the case of aged volume state.

In this respect, the structure of GC queue of dirty segments may be described as an array of dirty segments chains that is ordered by invalid blocks count as indexes of array. Every index of the array may group dirty segments with a concrete number of invalid blocks in a segment. The GC queue may have counter of dirty segments in chain for every index of invalid blocks count in array. Indexes of GC queue's array may be distributed between range areas. The range area may have two counters: an input counter of dirty/pre-dirty segments that go into the range area, and an output counter of partially/fully cleared segments that go out of the range area. Every range area may be characterized by a migration rate value. The migration rate may be calculated by means of subtraction of the input counter's value from output counter's value. The migration rate may describe the intensity of segment migration in/out from the range area.

Devices, elements, units and other arrangements disclosed herein can be implemented by software or hardware elements or any kind of combination thereof. Furthermore, devices disclosed herein may be processors or may comprise processors, wherein the functions of the elements, units and other means disclosed herein may be implemented in one or more processors to perform or implement methods disclosed herein.

BRIEF DESCRIPTION OF DRAWINGS

The following description of examples and embodiments will be explained in relation to the drawings, in which.

DESCRIPTION OF EMBODIMENTS

Figure 1:
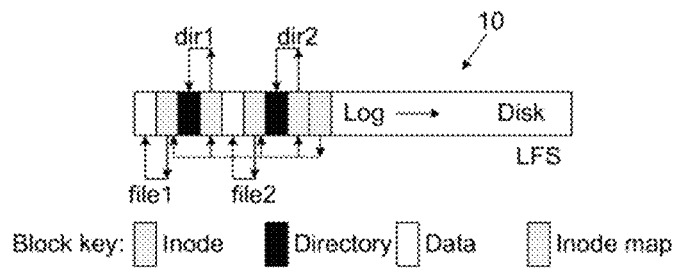
FIG. 1 shows a conventional structure of an exemplary log-structured file system.
Figure 2:
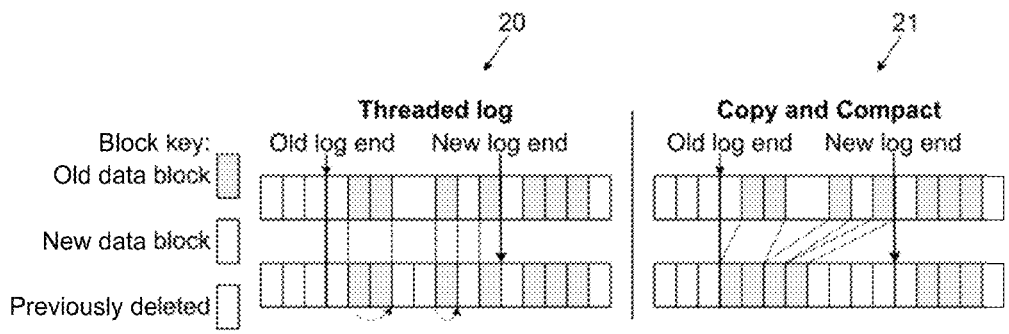
FIG. 2 shows two different conventional options of garbage collection in a log-structured file system.
Figure 3:
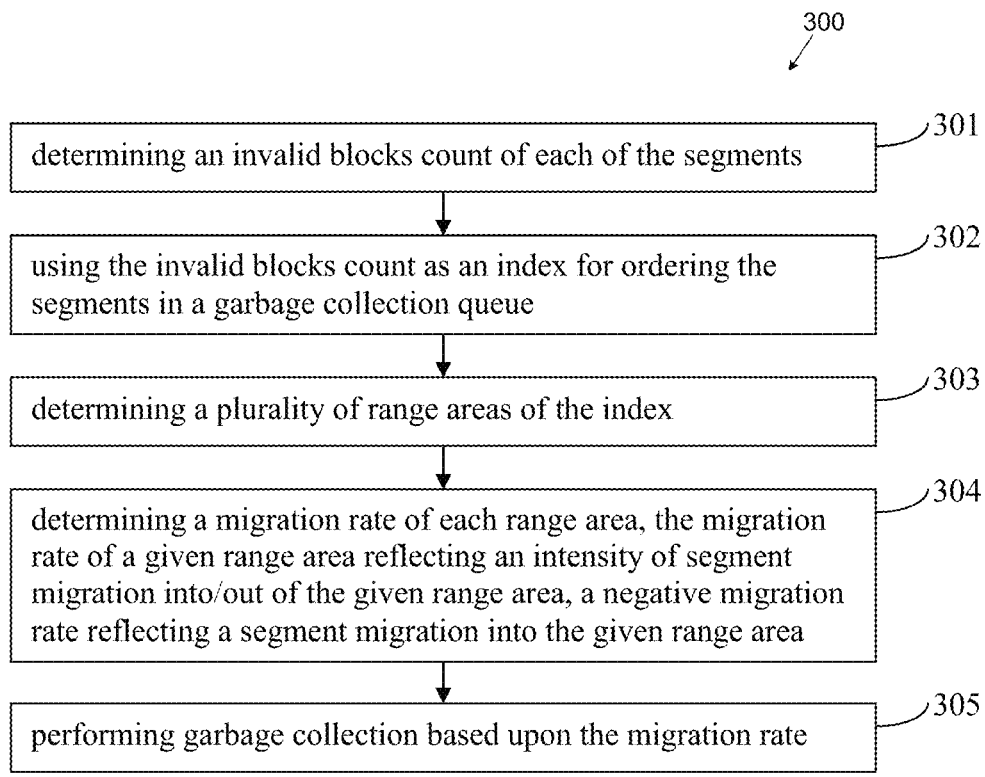
FIG. 3 shows a method for garbage collection according to one embodiment.

The following examples and embodiments are described with reference to FIGS. 3-16. In FIG. 3, method 300 shows a garbage collection operation of a volume in a log-structured file system according one embodiment. The volume comprises a plurality of segments. Each of the segments comprises a plurality of blocks. Method 300 comprises steps 301-305.

At step 301, an invalid block count is determined for each of the segments.

At step 302, using the invalid block count as an index, the segments in a garbage collection queue are ordered.

At step 303, a plurality of range areas of the index is determined.

At step 304, a migration rate of each range area is determined. The migration rate of a given range area can reflect an intensity of segment migration into/out of the given range area, wherein a negative migration rate reflects a segment migration into the given range area.

At step 305, garbage collection based upon the migration rate is performed.

Figure 4:
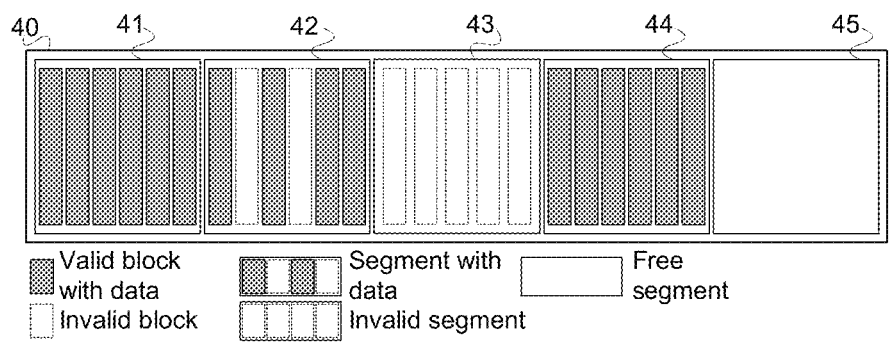
FIG. 4 shows exemplary blocks and segments in a volume according to one embodiment.

Exemplary information regarding typical log-structured file systems can be described as illustrated in FIGS. 4-16. A volume 40 of log-structured file system (LFS), as shown in FIG. 4, can be a chain of segments 41, 42, 43, 44, 45. Each segment 41, 42, 43, 44, 45 is an aggregate of physical disk blocks. The capacity of a segment is usually 2 MB or 8 MB. LFS allocates free space by means of allocation from a free segment pool. Free space in a segment is used for free blocks allocation for creating or updating files. A segment of LFS can be:

(1) completely or partially free;
(2) completely filled by blocks with valid data;
(3) completely filled by invalid blocks;
(4) filled by valid as well as invalid blocks.

An invalid block can be a block that was written previously by a file data. After a file update, the block can store obsolete data in its current state.

According to one example, LFS can treat its storage as a circular log and write sequentially to the head of log. Thereby, invalid blocks are a consequence of the Copy-on-Write, COW, policy of LFS's principle of functioning. The COW policy means that modified file's blocks are not updated in place but these modified blocks are written in a last log.

Figure 5:
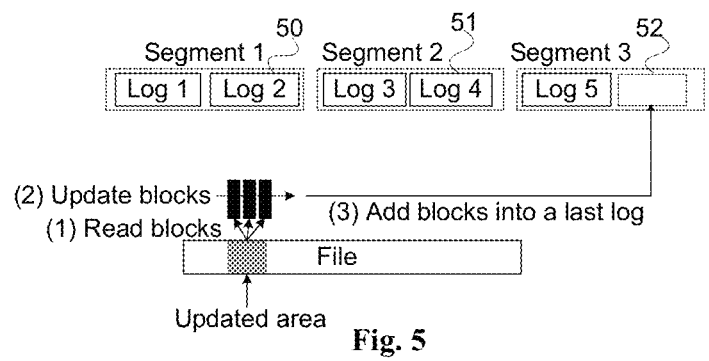
FIG. 5 shows an overview of a garbage collection of several segments according to one embodiment.

An exemplary write operation in a log-structured file system is shown in FIG. 5. Segments 50, 51 and 52 are at least partially filled with data. In the here-depicted operation an additional block is written to segment 52.

Log-structured file systems, however, reclaim free space from the tail of the log to prevent the file system from becoming full when the head of the log wraps around to meet it. The tail can release space and move forward by skipping over data for which newer versions exist farther ahead in the log. If there are no newer versions, then the data is moved and appended to the head.

Figure 6:
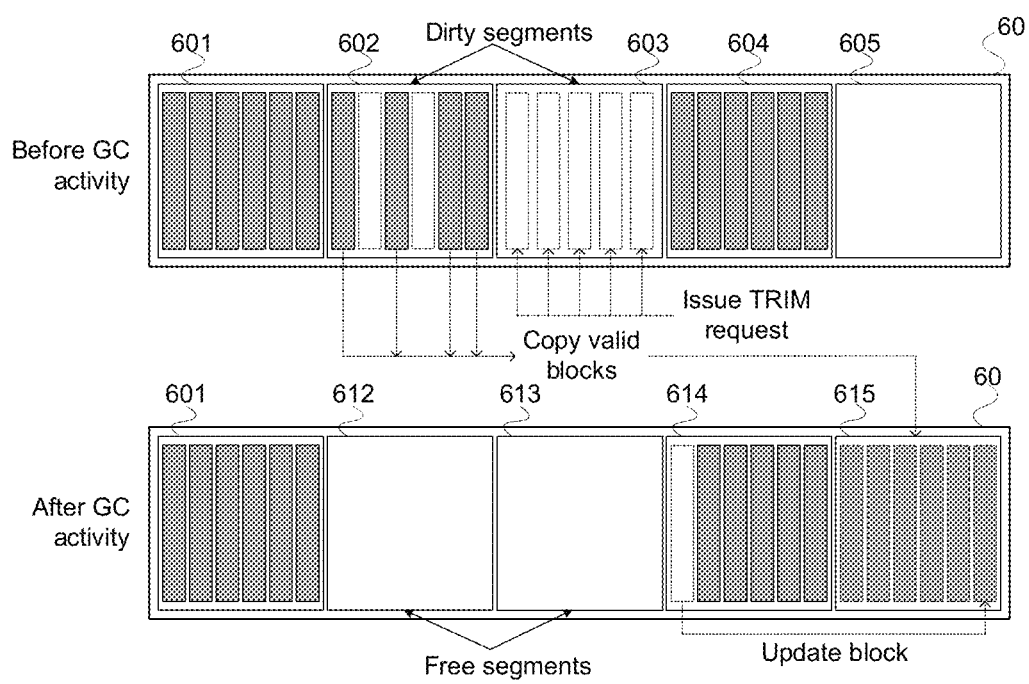
FIG. 6 shows several blocks and segments before and after garbage collection activity according to one embodiment.

A garbage collection operation is shown, for example, in FIG. 6. The upper part of FIG. 6 shows the situation before the garbage collection. Segments 601, 602, 603, 604 and 605 are present within a volume 60. The segments 602 and 603 are dirty segments.

The lower section of FIG. 6 shows the situation after the garbage collection. The volume 60 still comprises the segment 601. The segment 602 is still present as segment 612, segment 603 is present as segment 613, segment 604 is present as segment 614 and segment 605 is present as segment 615. For one embodiment, the content of these respective segments has changed. The dirty segments 602 and 603 are part of garbage collection. This means that the content of the dirty segment 602 is copied and written to the empty segment 605 resulting in segment 615. Since the segment 603 contained no valid data, garbage collection of this segment merely includes labeling the segment as free segment 613. Moreover, in FIG. 6 the update of a single block of the segment 604 is shown. This block is considered free and the content has been copied to segment 615.

For one embodiment, in log-structured file systems, each segment is a sequence of blocks. A block of a segment can be:

(1) "free";
(2) "pre-allocated";
(3) "valid", and
(4) "invalid".

These block states can be described according to the following table.

| Complex State | Pair of simple States | Description |
|---|---|---|
| Free | [Free:Clean] | Block has prepared for the write operation but it was not allocated yet. |
| Invalid | [Free:Dirty] | Block has been freed after file update, file truncation or deletion operation but it was not collected as garbage yet. |
| Pre-Allocated | [Allocated:Clean] | Block has been pre-allocated for a file but it was not written by any data yet. |
| Valid | [Allocated:Dirty] | Block has been allocated and it was written by data. |

Different combinations of block states in a single segment can define the state of segment itself. As a result, a segment can be:

(1) "clean";
(2) "using";
(3) "used";
(4) "pre-dirty";
(5) "dirty".

For one embodiment, segment states can be defined according to the following table.

| State | Description |
|---|---|
| Clean | All blocks in segment are free blocks. |
| Using | Segment has valid, invalid, pre-allocated and free blocks. |
| Used | All blocks in segment are valid blocks. |
| Pre-dirty | Segment has valid and invalid blocks only. |
| Dirty | All blocks in segment are invalid blocks. |

Figure 7:
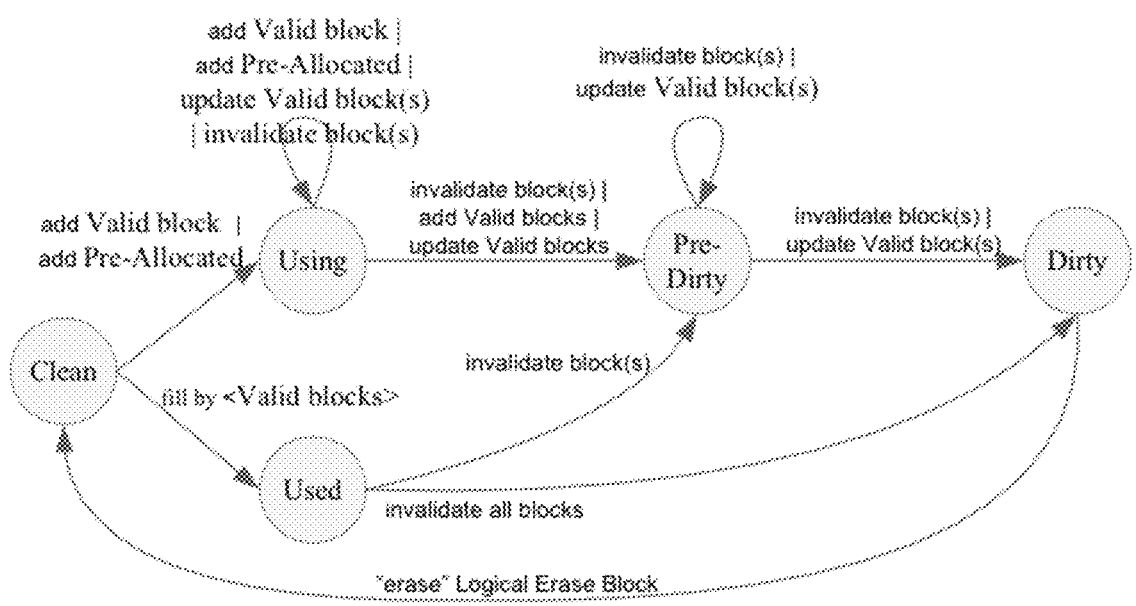
FIG. 7 shows a state diagram of different block states according to one embodiment.

FIG. 7 illustrates possible segment state transformations in a state diagram. First, in state 71, an exemplary segment is completely clean. A segment is in "using" state after allocation of segment for last log saving on a volume. This corresponds to the segment state 72. The "using" state 72 can be transformed in "used" state 75 or "pre-dirty" state 73 after exhausting of segment's free space by saved logs. The "used" state 75 of the segment can be shifted to the "pre-dirty" state 73 as a result of a deletion or an update operation. Finally, the segment enters the "dirty" state 74 after invalidation of all blocks in the segment. The segment is transformed to the "clean" state 71 by performing a garbage collection GC.

The count of valid blocks in the segment is a factor that defines the intensity of GC working during clearing of the segment because of the necessity to copy all valid blocks from cleared segments into the last log. The cost of segment clearing can grow with increasing valid blocks count in a segment. As a result, GC can select segments with least clearing cost. But only using a "least clearing cost criterion" is not enough for most efficient GC, since in different volume states such a criterion can have a different efficiency and even result in a significant performance overhead. Alternatively, segments can be grouped on the basis of a count of valid blocks in a segment.

For one embodiment, a combination of segment count in different groups can be a basis for distinction of possible volume states. The following table describes possible volume states.

| State | Description |
|---|---|
| Clean | Volume contains only clean segments. |
| Icy | The most of allocated segments on volume have 100% of valid blocks. |
| Cold | The most of allocated segments on volume have 80%-99% of valid blocks. |
| Cooling-off | The most of allocated segments on volume have 65%-80% of valid blocks. |
| Warming-up | The most of allocated segments on volume have 50%-65% of valid blocks. |
| Warm | The most of allocated segments on volume have 35%-50% of valid blocks. |
| Pre-hot | The most of allocated segments on volume have 20%-35% of valid blocks. |
| Hot | The most of allocated segments on volume have 1%-20% of valid blocks. |
| Boiling | The most of allocated segments on volume have 0% of valid blocks. |

An invalid blocks count can be a criterion for the structure of the GC queue of pre-dirty/dirty segments. Such a criterion is a way of selecting pre-dirty/dirty segments with minimal clearing cost. The GC queue can be structured as array of dirty segment chains and is ordered by invalid blocks count as indexes of the array. This is readily depicted in FIG. 8. As a result, GC can choose garbage collection segments as segments for clearing with the greatest count of invalid blocks. Moreover, calculating of the segments count in different ranges of invalid blocks count gives opportunity for detection of the volume state as shown in the previous table.

Figure 8:
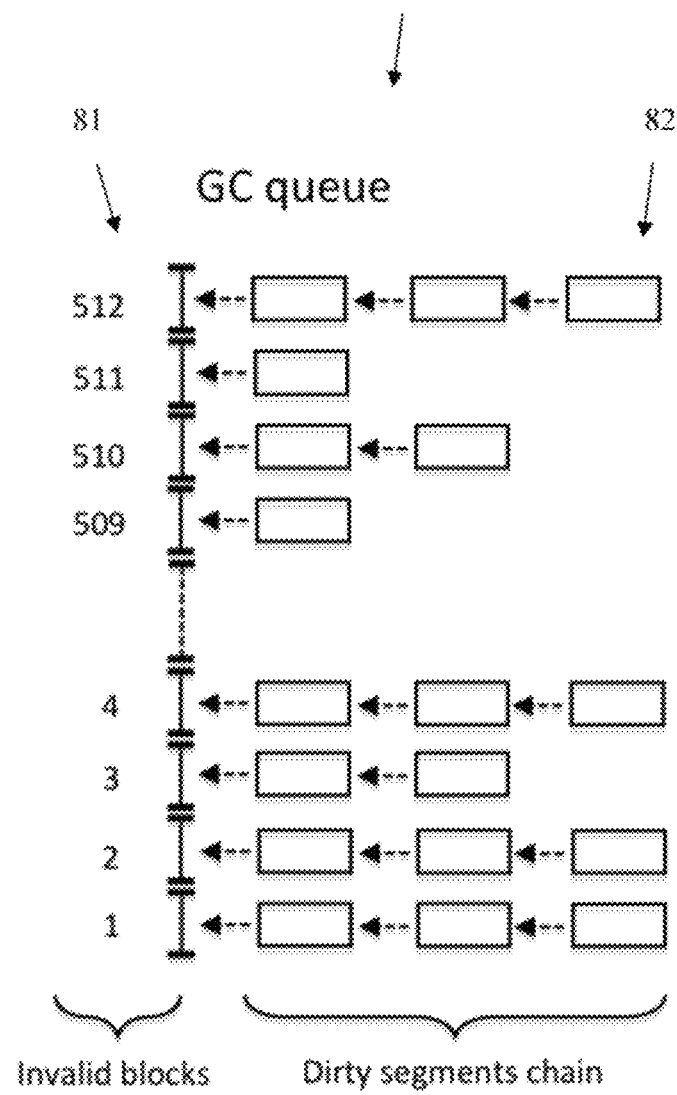
FIG. 8 shows an exemplary garbage collection queue according to one embodiment.

In FIG. 8, a garbage collection queue 80 is shown. As an index, a number of invalid blocks of the segments 81 is used. The index corresponds to the invalid blocks count that ranges from 1 to 512. Each index number corresponds to a chain of segments 82, i.e. to a list of segments, to be cleared.

Two factors, at a minimum, can define efficiency of garbage collection:

1. GC threads number, and/or
2. Intensity of GC thread activity.

The GC threads number can be an important factor that directly influences the system performance in that it can increase or decrease the whole file system performance. First, flushing blocks may be placed in an I/O scheduler queue. As a result, superfluous number of GC threads will degrade performance. From another point of view, sophisticated policy of pre-dirty/dirty segments processing for aged volume state can require significant computational capability. This means that LFS volume state can determine the amount of calculation activity in processing of pre-dirty/dirty segments with the purpose to find good victim, i.e. to find appropriate segments, for garbage collection. As such, a different volume state needs in various number of GC threads for efficient garbage collection processing. Finally, the GC threads number may be correlated with the CPU cores number and with the log-structured file system volume's state.

The GC activity can add significant overhead to file system performance at whole. From the performance point of view, efficient management of GC activity is a crucial point of a log-structured file system. Another aspect of the GC activity management policy efficiency is the necessity to clear enough number of dirty/pre-dirty segments for any state of log-structured file system's volume. As a result, efficient GC activity management policy may take into account: (1) I/O load of main file system operations; and/or (2) current state of file system volume. The most desirable time of GC activity is system idle time. The knowledge of log-structured file system's volume state can define for current moment of time segments that should be cleared with minimum impact on file system performance and with goal to clear enough count of dirty/pre-dirty segments.

Figure 9:
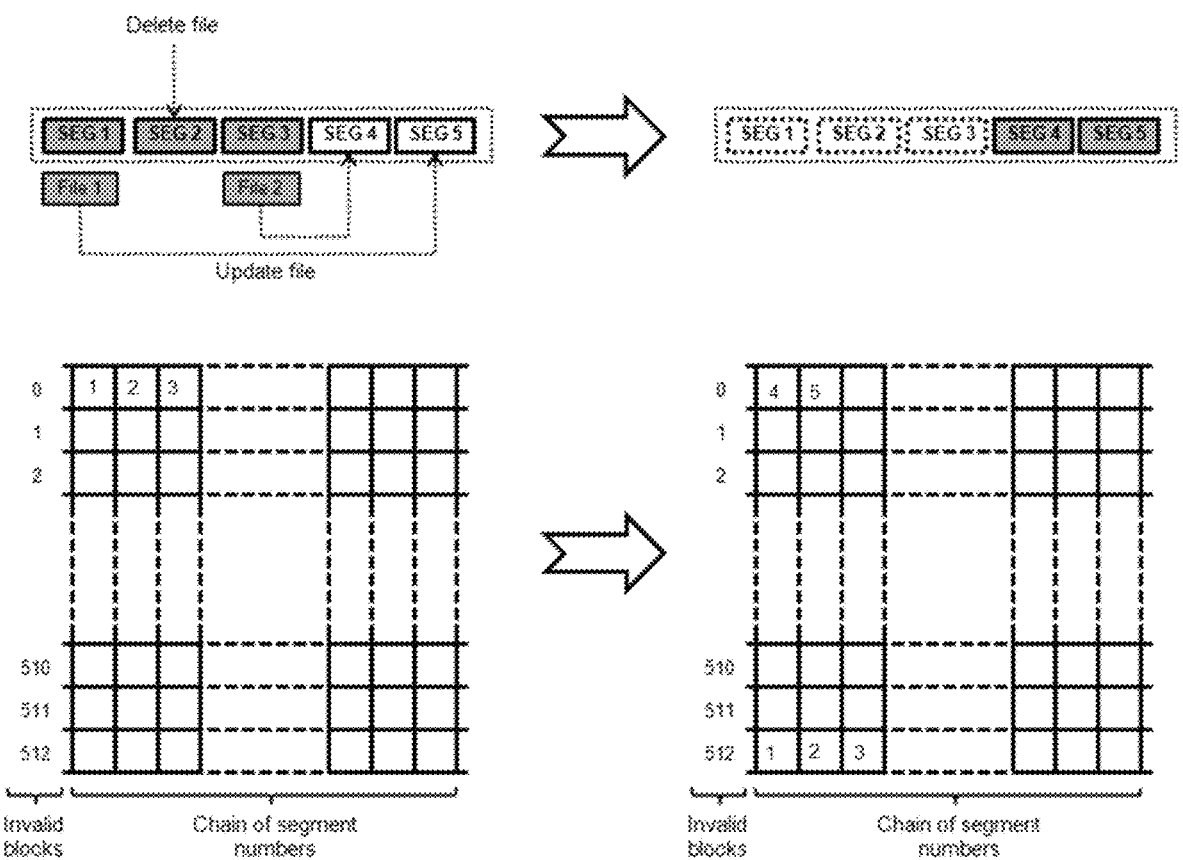
FIG. 9 shows several segments before and after garbage collecting and garbage collection queues according to one embodiment.

Referring to FIG. 9, in an upper left part, a volume 90 that has three segments in "used" state initially is depicted. These used segments are identified as SEG1, SEG2, and SEG3. These used segments comprise by definition only valid blocks. Each segment number is located in the chain for segments with an invalid blocks count of 0. In the lower left part of FIG. 9, a garbage collection queue is shown. In particular, the chain of the three used segments SEG1, SEG2, and SEG3 is classified as comprising "0" invalid block and has low priority for GC.

For one embodiment, a deletion of a file located in segment #2, i.e. SEG2, and an updating of files located in segments #1 and #3, i.e. SEG1 and SEG3, are performed. The resulting volume 91 is displayed in an upper right part of FIG. 9. The updated files are now located in segments #4 and #5, and the segments #1, #2 and #3 now comprise respectively 512 invalid blocks. A resulting garbage collection queue is shown in a lower right part of FIG. 9.

Figure 10:
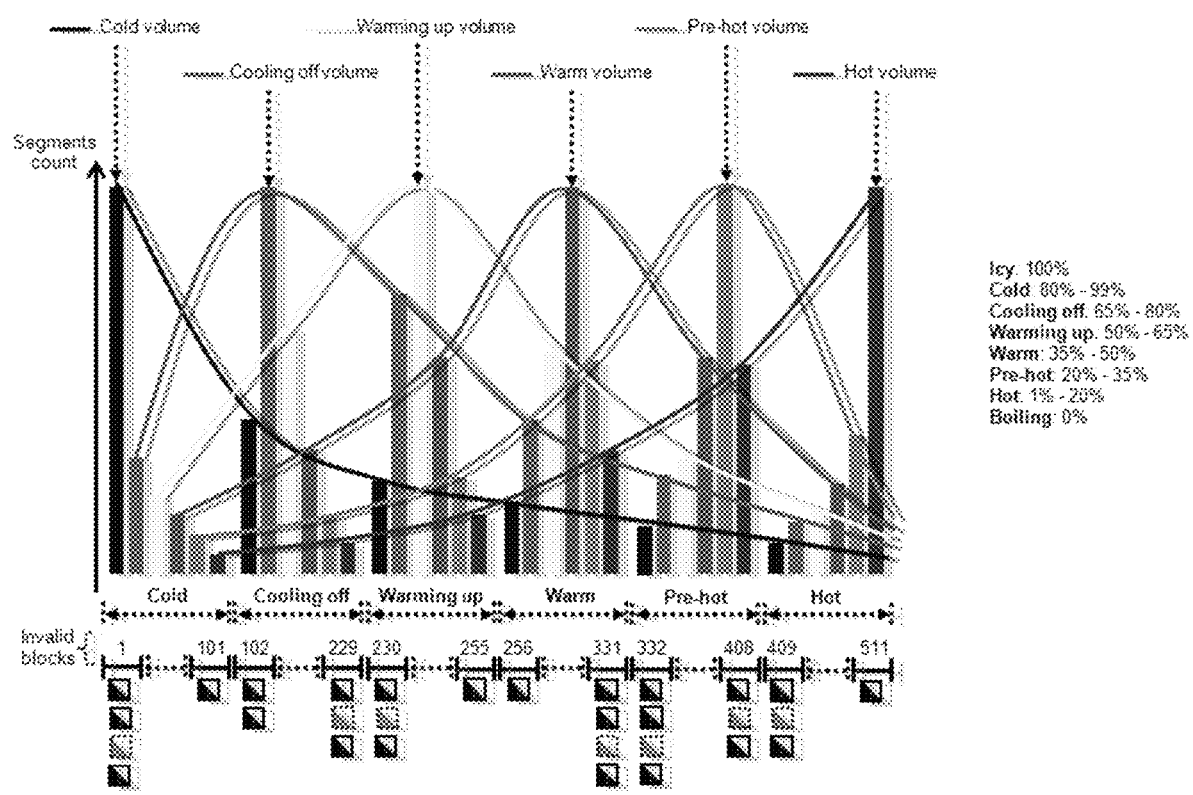
FIG. 10 shows exemplary diagrams of a segments count as a function of an invalid blocks count.

Knowledge of the distribution of segment count between states with various invalid block counts gives opportunity to build a graphical representation of segment count dependence from invalid blocks count. Such representations are shown in FIG. 10. The calculating of the segments count in different ranges of invalid blocks count gives opportunity for detection of the volume state. The detected volume state may correspond to the state defined in the previous table. Alternatively, the volume states may be defined in terms of invalid blocks according to the following table:

| State | Description |
|---|---|
| Icy | Volume contains only clean segments, i.e. 100% of valid blocks. |
| Cold | The most of allocated segments on volume have from 1 to 101 invalid blocks, or alternatively up to approximately 20% of invalid blocks. |
| Cooling-off | The most of allocated segments on volume have from 102 to 229 invalid blocks, or approximately from 20% to 45% of invalid blocks. |
| Warming-up | The most of allocated segments on volume have from 230 to 255 invalid blocks, or approximately from 45% to 50% of invalid blocks. |
| Warm | The most of allocated segments on volume have from 256 to 331 invalid blocks, or approximately from 50% to 65% of invalid blocks. |
| Pre-hot | The most of allocated segments on volume have from 332 to 408 invalid blocks, or approximately from 65% to 80% of invalid blocks. |
| Hot | The most of allocated segments on volume have from 409 to 511 invalid blocks, or approximately from 80% to 99% of invalid blocks. |
| Boiling | The most of allocated segments on volume have 100% of invalid blocks. |

From this information, i a peak of the data can be determined in a diagram as shown in FIG. 10, which shows several embodiments for the segments count as a function of the invalid blocks count. A first curve presents a maximum of the segment count for a value of 1 invalid block and can relate to a cold volume. Another curve has a peak at an invalid blocks count between 102 and 229, resulting in a volume state "cooling off". Four other curves are shows with a peak located respectively at an invalid blocks count between 230 to 255, 256 and 331, 332 and 408, and 409 and 511. These four other curves can relate, respectively, to the warming-up state, the warm state, the pre-hot state, and the hot state.

According to one embodiment, indexes of the GC queue array can be distributed between range areas. Referring to step 304 of FIG. 3, the following can be determined: a migration rate of each range area, the migration rate of a given range area reflecting an intensity of segment migration into/out of the given range area, a negative migration rate reflecting a segment migration into the given range area. And, referring to step 305, garbage collection can be performed based upon the determined migration rate.

Figure 11:
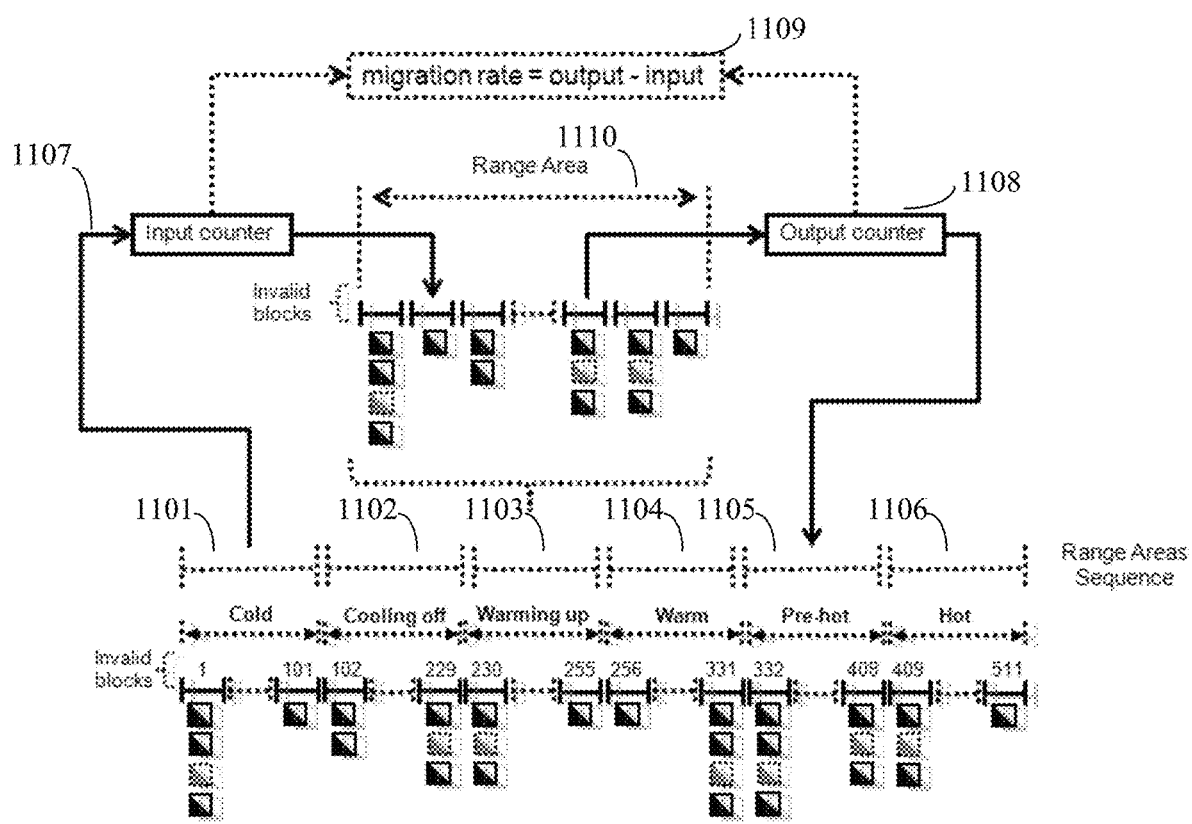
FIG. 11 shows migration rate determination according one embodiment.

For one embodiment, the migration rate of a given range area may be determined as illustrated in FIG. 11. Migration rate can be obtained by determining a value of an input counter 1107 of dirty/pre-dirty segments that migrate into a given range area 1110, determining a value of an output counter 1108 of partially/fully cleared segments that migrate out of the given range area 1110, and calculating the migration rate of the given range area 1110 by means of subtraction 1109 of the value of the input counter 1107 from the value of the output counter 1108.

A cold range area 1101 comprises a range of invalid block counts that can define the hot volume state, i.e. the cold range area 1101 ranges from the value 1 to 101 for the invalid block count. Similarly, a cooling off range area 1102 can be defined as comprising the range of invalid block count that define the cooling off volume state, i.e. the cooling off range area 1102 ranges from the value 102 to 229 for the invalid blocks count. Similarly, a warming up range area 1103, a warm range area 1104, a pre-hot range area 1105 and a hot range area 1106, respectively, can correspond to the range of invalid block count that can define the warming up volume state, the warm volume state, the pre-hot volume state, and the hot volume state.

Each range area can include dirty segments lists (or trees) from less value of invalid block count to greater ones in ascendant order. Each range area should have two counters: (1) the input counter 1107 of dirty segments that to go into this range area; (2) the output counter 1108 of partially/fully cleared segments that go out from this range area. This can mean that (1) it is required to increment the output counter 1108 of the given range area 1110 if a segment goes out of said given range area 1110, and, (2) it is required to increment the input counter 1107 of the given range area 1110 if a segment migrates into said given range area 1110.

Each range area can be characterized by a migration rate value. This value can be calculated with some timeout by means of subtraction 1109 of the input counter's value from the output counter's value. The migration rate describes the intensity of segment migration in this range area.

Knowledge of dirty segments distribution between lists (or trees) for various invalid block count gives the opportunity to distinguish dirty segment lists with greatest count of dirty segments in it. As a result, such understanding results in knowledge of area(s) that should be processed by GC. But the knowledge of the absolute count of dirty segments in a list does not give opportunity to decide about the real necessity to collect garbage in this area(s). Actually, GC operates in background of main file system operations. Update and delete operations result in natural migration of dirty segments between areas in GC queue.

It may be the case that a range area contains one the one hand a peak of the dirty segments count, i.e. contains a maximum of the segments count function. On the other hand, the natural output of dirty segments from this range area can be above the natural input into this range area. In such a case, it does not make sense to collect garbage in this range area. The distribution of migration rates between range areas is used by the disclosure to enhance the GC queue model by knowledge about real necessity of GC activity. Thereby, only range areas with negative migration rates, wherein the input counter 1107 is greater than the output counter 1108, should be processed by GC.

Figure 12:
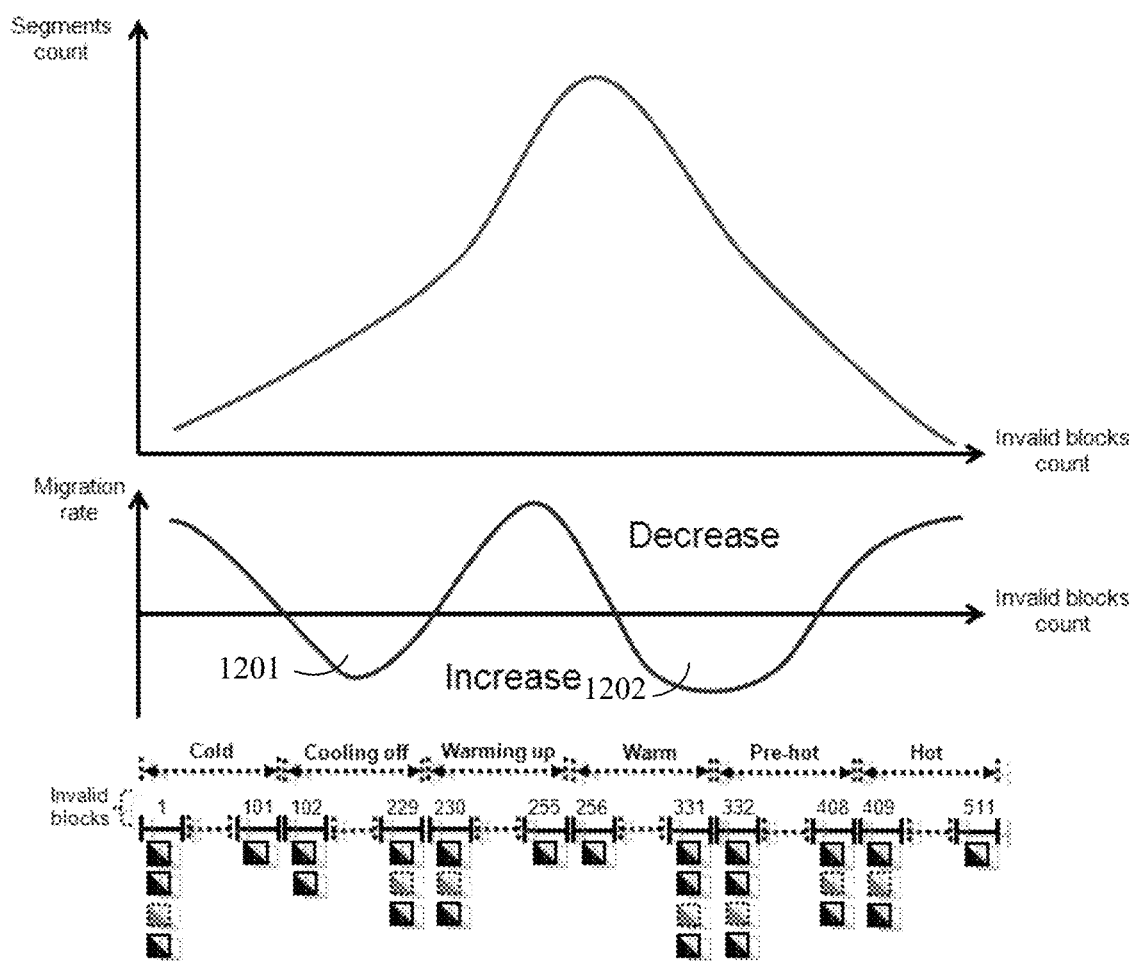
FIG. 12 shows an exemplary diagram showing a segments count and a migration rate as a function of an invalid blocks count.

FIG. 12 shows an embodiment of a migration rate diagram. According to one embodiment, garbage collection can be performed based upon the migration rate. Garbage collection can be based upon negative peaks of the migration rate. FIG. 12 shows two negative peaks 1201, 1202 of the migration rate, such that the garbage collection may be performed in the range areas comprising these negative peaks.

Additionally, garbage collection can be based upon negative peaks of the migration rate by deducing some priorities from the negative peaks of the migration rate and to perform garbage collection based upon these priorities. Such an operation can include identifying negative peaks of the migration rate, identifying the respective range areas comprising the identified negative peaks, assigning to each identified range area a priority reflecting the absolute value of the identified negative peak, and performing garbage collection of the segments located in the identified range areas depending on the priority of the identified range areas.

Referring to FIG. 12, for one embodiment, the second negative peak 1202 is lower than the first negative peak 1201. Accordingly, the range area comprising the second negative peak 1202 is associated with a higher priority than the range area comprising the first negative peak 1201. The garbage collection is then performed in the range area comprising the second negative peak 1202 with a higher priority than in the range area comprising the first negative peak 1201.

Particularly, the higher the absolute value of the peak in the negative area of the migration rate diagram shown in FIG. 12, the higher the priority for executing GC for the range area comprising this peak.

According to one embodiment, the dependence of the migration rate of various range areas from invalid blocks count gives also the opportunity to decide how many GC threads should operate for concrete volume aging state. Namely, the peak in negative area on migration rate diagram is a basis for starting a GC thread because it means that dirty segments count is growing in this range area. If some range area contains significant count of dirty segments and noticeable negative migration rate then such range area should have dedicated GC thread. If the migration rate diagram contains significant count of negative peaks then one GC thread can process several adjacent range areas.

Migration rate of various range areas gives opportunity to decide how many GC threads should operate for concrete volume aging state. Namely, the peak in negative area in the migration rate diagram is a basis for starting a GC thread because it means that the dirty segments count is growing in this range area. If some range area contains significant count of dirty segments and noticeable negative migration rate then such range area should have dedicated GC thread. If the migration rate diagram contains significant count of negative peaks then one GC thread can process several adjacent range areas.

Figure 13:
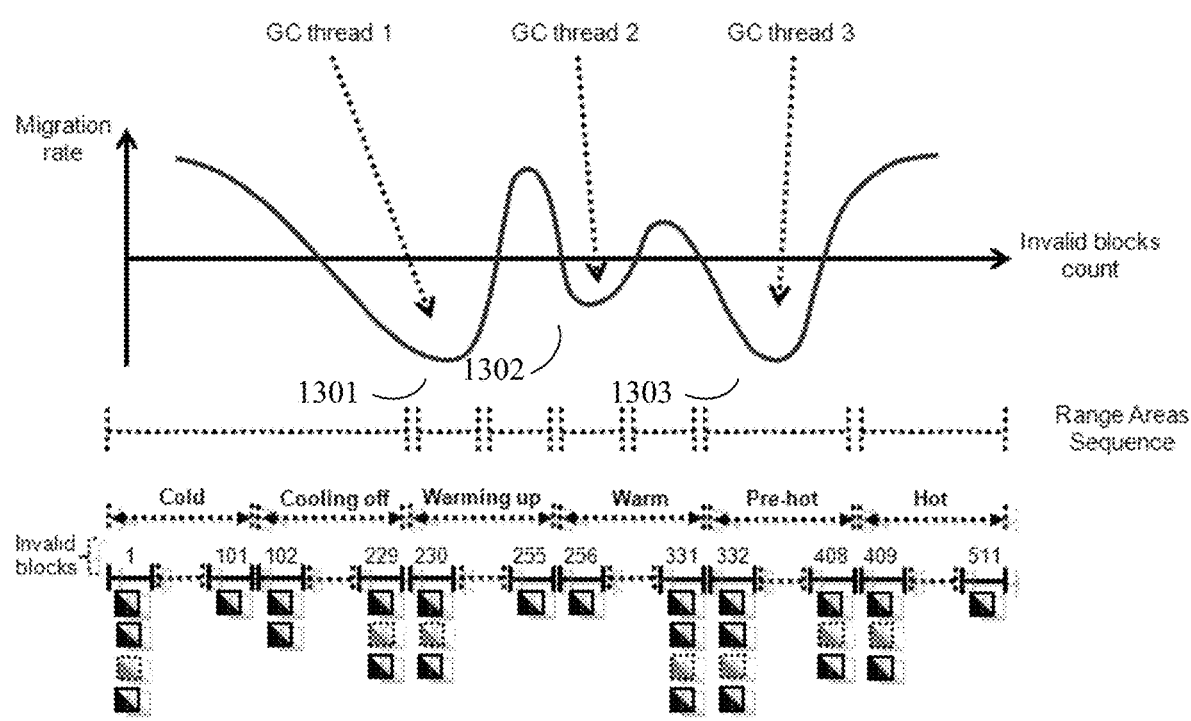
FIG. 13 shows a further exemplary diagram showing a migration rate as a function of an invalid blocks count.

Accordingly, FIG. 13 shows an embodiment regarding the scheme of GC threads number determination. In FIG. 13, the migration rate presents three negative peaks 1301, 1302, 1303. Accordingly, one GC thread may be allocated to each of these negative peaks 1301, 1302, 1303.

Moreover, the range areas can have different length for different ranges of invalid blocks count. Index ranges can be joined for cold and cooling-off volume states in one range area because GC should have minimum activity in these areas. Warming-up and warm volume state index ranges may need more detailed division on range areas because of noticeable clearing cost and necessity in sensitive clearing policy in these areas.

Further on, the behavior of the negative peaks of the migration rate diagram can define intensity of GC thread activity. First, maximum value of negative peak can define count of segments that it makes sense to clear in this range area with the purpose to compensate input in this area. Second, GC should stop clearing activity in some area in the case of exhausting of negative peak's capacity.

Figure 14:
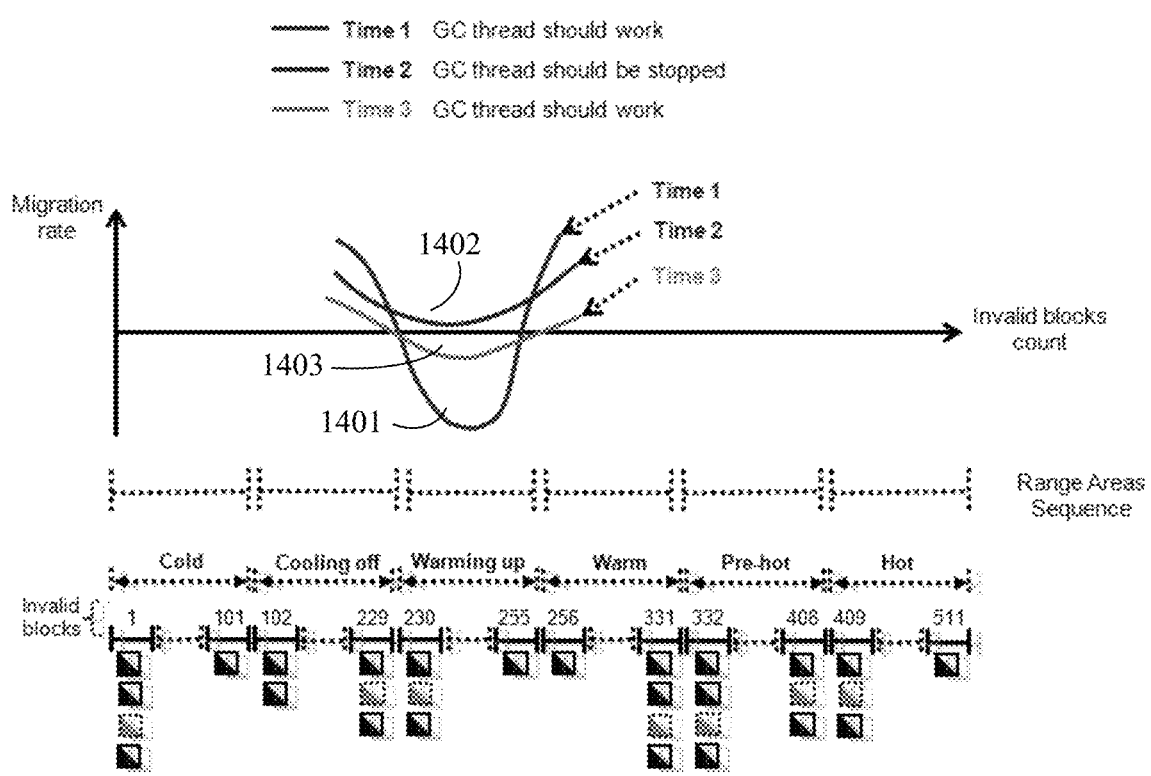
FIG. 14 shows a further exemplary diagram showing a migration rate as a function of an invalid blocks count at different moments.

Accordingly, FIG. 14 shows an embodiment of regarding a scheme of GC thread activity determination. At time 1, a negative peak 1401 of the migration rate is identified in the warming up range area, such that garbage collection is performed in this range area and the GC thread allocated to this range area should work. At time 2, the warming up range area does not comprise any negative peak anymore: the minimum 1402 of the migration rate in the warming up range area now has a positive value. Consequently, the garbage collection should be stopped in this area, i.e. the GC thread allocated to this range area should be stopped. After this stop, the migration rate may decrease again so that at time 3, said warming up range area again presents a negative peak, i.e. a local minimum with a negative value: in this case the garbage collection should be performed again in this range area, i.e. the allocated GC thread should work again.

Figure 15:
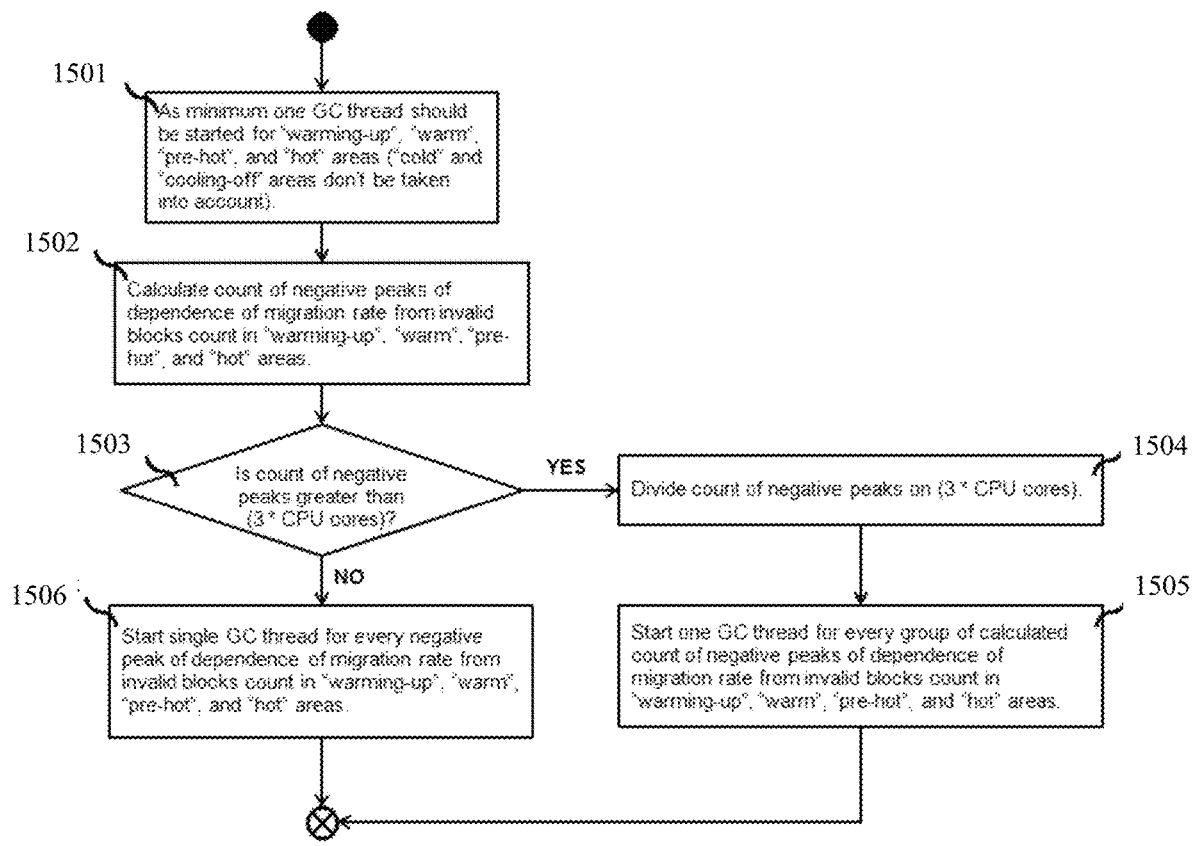
FIG. 15 shows garbage collection threads number definition according to one embodiment.

FIG. 15 shows an embodiment of a garbage collection threads number definition operation. At step 1501, a minimum one GC thread should be started for the "warming-up", "warm", "pre-hot", and "hot" ranges areas. Preferably, the "cold" and "cooling-off" range areas are not taken into account, i.e. no GC thread should be started for these range areas.

At step 1502, the count of negative peaks of the migration rate is calculated as a function of the invalid blocks count in the "warming-up", "warm", "pre-hot", and "hot" range areas. A negative peak may be defined in each embodiment of the present disclosure as a local minimum of the migration rate as a function of the invalid blocks count.

At step 1503, it is checked if the count of negative peaks is greater than (3*CPU cores). The value CPU cores refers to the number of central processing unit cores used for operating the log-structured file system.

If the count of negative peaks is greater than (3*CPU cores), then it is proposed in a fourth step 1504 to divide the count of negative peaks on (3*CPU cores). In a fifth step 1505, one GC thread is then started for every group of calculated count of negative peaks of the migration rate as a function of the invalid blocks count in the "warming-up", "warm", "pre-hot", and "hot" range areas.

If the count of negative peaks is not greater than (3*CPU cores), then it is proposed in a sixth step 1506 to start a single GC thread for every negative peak of the migration rate as a function of the invalid blocks count in the "warming-up", "warm", "pre-hot", and "hot" range areas.

Figure 16:
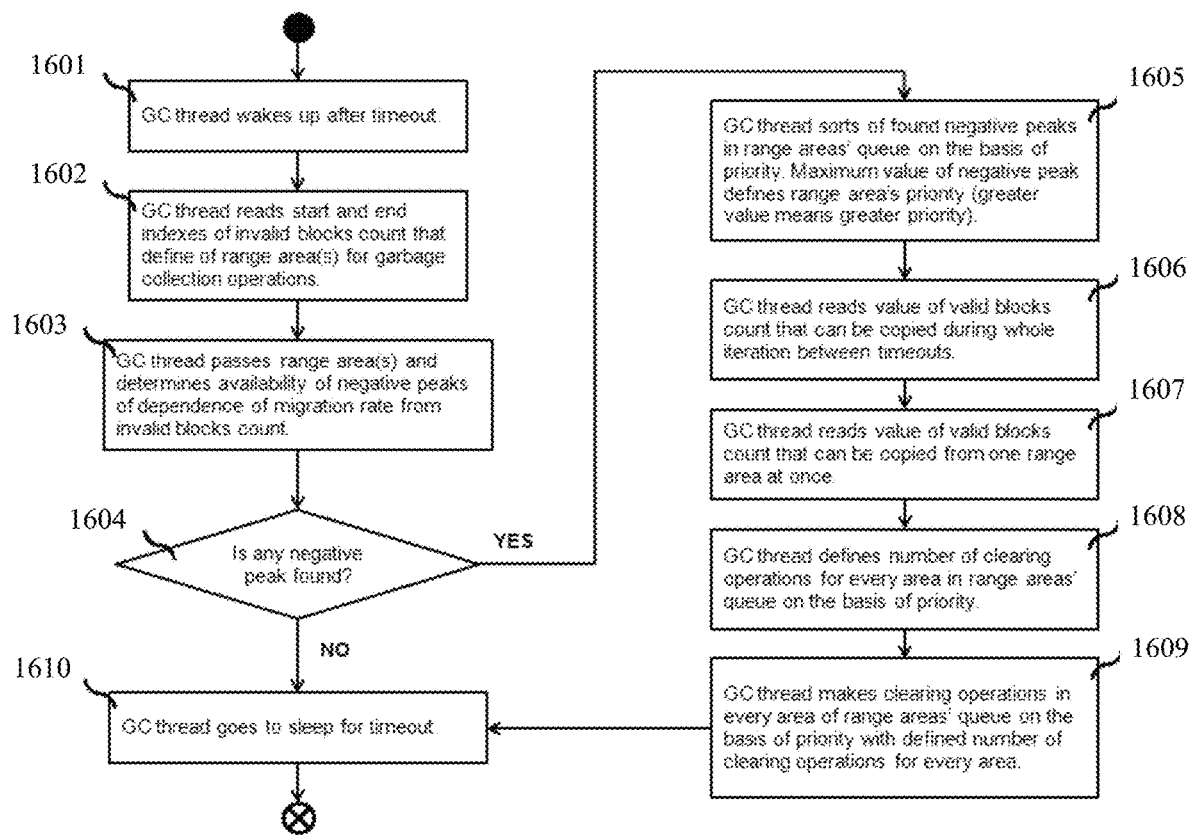
FIG. 16 shows garbage collection thread's activity definition according to one embodiment.

FIG. 16 shows an embodiment of a garbage collection thread activity definition operation.

At step 1601, a GC thread wakes up after a given timeout. The GC thread is preferably associated with one or more range areas so as to perform GC for the associated range area(s).

At step 1602, the GC thread reads, i.e. obtains, the indexes of the invalid blocks count that define the associated range area(s) for garbage collection operations. The GC thread in fact reads the start index of the invalid blocks count of the associated range area(s) as well as the end index thereof. According to the exemplary range area definition of FIGS. 10 to 14, if the GC thread is associated to the warm range area then it obtains the values 256 and 331 as start and end indexes.

At step 1603, the GC thread passes the range area(s) and determines the availability of negative peaks of the migration rate as a function of the invalid blocks count. For example, if the GC thread is associated to the warm range area and has read the values 256 and 331 as start and end indexes, then the GC thread checks if at least one negative peak is present in the range area delimited by the indexes 256 and 331.

At step 1604, it is determined whether or not at least one negative peak of the migration rate is present in the range area(s) associated to the GC thread.

If one or several negative peaks have been found in the associated range area(s), then in a fifth step 1605 the GC thread sorts the found negative peaks in the associated range areas' queue on the basis of a priority. The maximum value of the negative peak defines the range area's priority. In other words, a lower negative peak means a greater priority. As a result, the associated range areas are ordered according to their priority. Particularly, the associated range areas that do not show any negative peak of the migration rate have no priority and the following steps 1606 to 1609 are not carried out for such range areas that do not show any negative peak.

At step 1606, the GC thread reads the value of valid blocks count that can be copied during whole iteration between timeouts.

At step 1607, the GC thread reads the value of valid blocks count that can be copied from one range area at once. In an eighth step 1608, the GC thread defines the number of clearing operations for every area in range areas' queue on the basis of the priority. In other words, the GC thread defines the number of clearing operations for every associated range area having at least one negative peak.

At step 1609, the GC thread makes clearing operations in every area of range areas' queue on the basis of the priority with the defined number of clearing operations for every area. In other words, the GC thread performs GC for the associated range areas having at least one negative peak. The GC is performed on the basis of the priority that has been defined for each associated range area: the GC is performed first for the associated range area having the highest priority, i.e. having the lowest negative peak. After the clearing operation step 1609, in a tenth step 1610 the GC thread goes to sleep for a given timeout.

After step 1604, if no negative peak has been found in the associated range area(s), at step 1610 in which the GC thread goes to sleep for a given timeout is carried out.

Various embodiments have been described and can be implemented with any type of storage medium including hard drives, solid state memory devices, random access memory devices or flash memory. Variations to the disclosed embodiments can also be practiced and implemented without departing from the scope of the invention as defined by the appended claims.

What is claimed is:

1. In a log-structured file system for garbage collection of a volume, the volume comprising a plurality of segments, wherein each segment comprises a plurality of blocks, a method comprising:
    determining an invalid block count of each of the segments;
    using the invalid block count as an index for ordering the segments in a garbage collection queue;
    determining a plurality of range areas of the index;
    determining a migration rate of each range area, the migration rate of a given range area reflecting an intensity of segment migration into/out of the given range area, a negative migration rate reflecting a segment migration into the given range area; and
    performing garbage collection based upon the migration rate.

2. The method according to claim 1, wherein determining the migration rate comprises:
    determining a value of an input counter of dirty/pre-dirty segments that migrate into the given range area;
    determining a value of an output counter of partially/fully cleared segments that migrate out of the given range area; and
    calculating the migration rate of the given range area by subtracting the value of the input counter from the value of the output counter.

3. The method according to claim 2, wherein determining the value of the input counter of dirty/pre-dirty segments includes determining segments migrate into the range area and incrementing the value of the input counter; and wherein determining the value of the output counter of partially/fully cleared segments includes determining segments migrate out of the range area and incrementing the value of the output counter.

4. The method according to claim 1, wherein performing garbage collection includes
    performing garbage collection based upon negative peaks of the migration rate.

5. The method according to claim 4, wherein performing garbage collection based upon negative peaks includes identifying a negative peak of the migration rate, identifying the range area comprising the identified negative peak, and performing garbage collection of the segments located in the identified range area.

6. The method according to claim 5, wherein performing garbage collection based upon negative peaks includes identifying negative peaks of the migration rate, identifying the respective range areas comprising the identified negative peaks, assigning to each identified range area a priority reflecting an absolute value of the identified negative peak, and performing garbage collection of the segments located in the identified range areas depending on the priority of the identified range areas.

7. The method according to claim 6, wherein performing garbage collection of the segments located in the identified range areas includes performing garbage collection with a plurality of garbage collection threads, and assigning the identified range areas to the plurality of garbage collection threads depending on the priorities of the identified range areas.

8. The method according to claim 7, wherein performing garbage collection based upon negative peaks includes identifying a range area comprising a negative peak of the migration rate, performing garbage collection by means of a plurality of garbage collection threads, and determining the identified range area has at least one dedicated garbage collection thread when the negative peak of the identified range area is lower than a peak threshold.

9. The method according to claim 8, further comprising determining the identified range area has at least one dedicated garbage collection thread when the negative peak of the identified range area is lower than the peak threshold and the identified range area comprises a count of dirty/pre-dirty segments above a count threshold.

10. The method according to claim 1, wherein determining the plurality of range areas of the index includes determining at least a hot range area as being the range area with the highest invalid blocks counts, a pre-hot range area as being the range area with the highest invalid blocks counts after the hot range area, a warm range area as being the range area with the highest invalid blocks counts after the pre-hot range area, and a warming-up range area as being the range area with the highest invalid blocks counts after the warm range area, wherein performing garbage collection based upon negative peaks includes performing garbage collection by means of a plurality of garbage collection threads, and starting at least one garbage collection thread for the hot, pre-hot, warm, and warming-up range areas.

11. The method according to claim 10, wherein performing garbage collection based upon negative peaks includes calculating count of negative peaks of the migration rate in the hot, pre-hot, warm, and warming-up range areas, and starting a single garbage collection thread for every negative peak of the migration rate in the hot, pre-hot, warm, and warming-up range areas when the count of negative peaks is not above three times the number of CPU cores.

12. The method according to claim 11, further comprising:
dividing the count of negative peaks on three times the number of CPU cores, and starting one garbage collection for every group of calculated count of negative peaks of the migration rate in the hot, pre-hot, warm, and warming-up range areas when the count of negative peaks is above three times the number of CPU cores.

13. The method according to claim 1, wherein determining an invalid blocks count of a segment includes determining how many blocks of the segment are invalid wherein an invalid block is a block that has been freed after any of file update, file truncation and deletion operation but that was not collected as garbage yet.

14. A computing device for performing garbage collection of a volume comprising:
a log-structured file system containing the volume, wherein the volume comprises a plurality of segments, each of the segments comprises a plurality of blocks;
a memory having a plurality of instructions stored thereon; and
a processor configured to execute the instructions stored in the memory and to:
determine an invalid block count of each of the segments,
use the invalid block count as an index for ordering the segments in a garbage collection queue,
determine a plurality of range areas of the index,
determine a migration rate of each range area, the migration rate of a given range area reflecting an intensity of segment migration into/out of the given range area, a negative migration rate reflecting a segment migration into the given range area, and
perform garbage collection based upon the migration rate.

15. The computing device according to claim 14, wherein the processor is further configured to:
determine a value of an input counter of dirty/pre-dirty segments that migrate into the given range area,
determine a value of an output counter of partially/fully cleared segments that migrate out of the given range area, and
calculate the migration rate of the given range area by means of subtraction of the value of the input counter from the value of the output counter.

16. The computing device according to claim 15, wherein the processor is further configured to:
determine segments migrate into the range area,
increment the value of the input counter,
determine segments migrate out of the range area, and
increment the value of the output counter.

17. The computing device according to claim 14, wherein the processor is further configured to perform garbage collection based upon negative peaks of the migration rate.

18. The computing device according to claim 17, wherein the processor is further configured to:
identify a negative peak of the migration rate,
identify the range area comprising the identified negative peak, and
perform garbage collection of the segments located in the identified range area.

19. The computing device according to claim 18, wherein the processor is further configured to:
identify negative peaks of the migration rate,
identify the respective range areas comprising the identified negative peaks,
assigning to each identified range area a priority reflecting an absolute value of the identified negative peak, and
perform garbage collection of the segments located in the identified range areas depending on the priority of the identified range areas.

20. The computing device according to claim 19, wherein the processor is further configured to:
perform garbage collection by means of a plurality of garbage collection threads, and assign the identified range areas to the plurality of garbage collection threads depending on the priorities of the identified range areas.

* * * * *